Oct. 4, 1960 M. L. ROSENTHAL 2,955,043
METHOD OF PACKAGING FROZEN MEATS
Filed Nov. 7, 1958
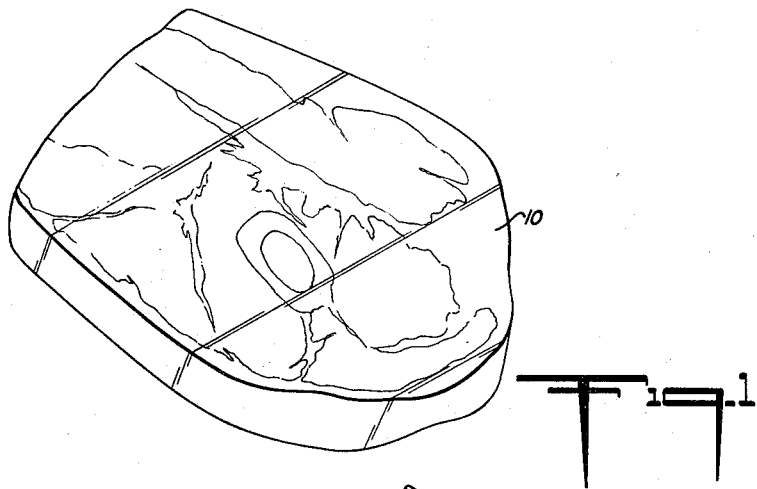
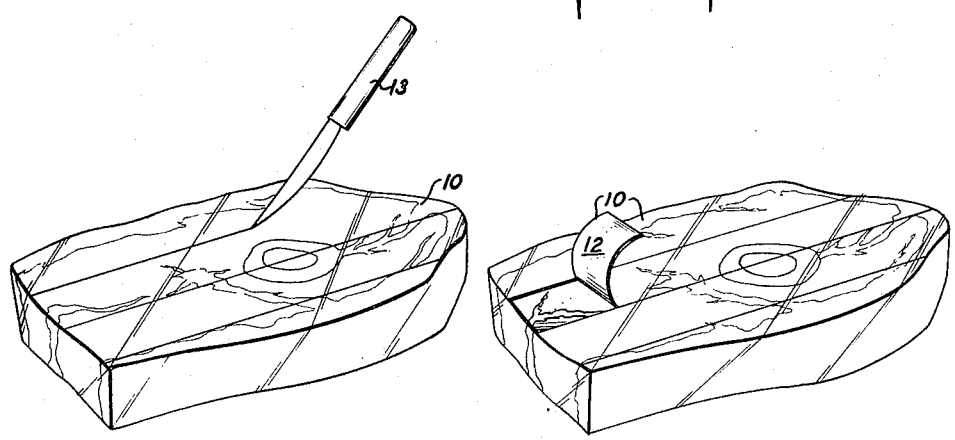
 
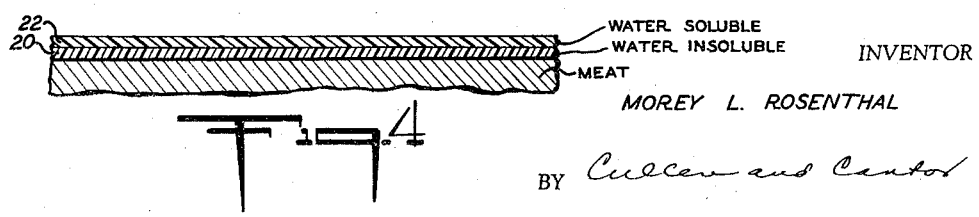
INVENTOR
MOREY L. ROSENTHAL
BY
ATTORNEYS

United States Patent Office

2,955,043
METHOD OF PACKAGING FROZEN MEATS

Morey L. Rosenthal, 1930 Division St., Detroit 7, Mich.

Filed Nov. 7, 1958, Ser. No. 772,522

10 Claims. (Cl. 99—169)

This invention relates to an improved method of packaging frozen meats and more particularly to a multiple coating of frozen meat to form a clear transparent flexible and non-clouding plastic film wrapper or packaging coating upon the surface of the frozen meat, serving to protect and preserve it, preventing discoloration and the loss of moisture therefrom, and greatly improving the appearance of the packaged frozen product. The invention while primarily practiced in the coating of meat, has also been used for dressed frozen poultry and fish and it is probable that other frozen food products can be packaged by the present method.

More particularly, the present coating method is applied to transparency conditioned frozen meat providing an outer water soluble coating superimposed upon an inner water insoluble coating as a combined laminate of compatible coatings upon the frozen meat, particularly improved by having an outer solid water soluble continuous plastic film coating containing or impregnated with a humectant whereby that coating is non-glazing and non-clouding, maintaining the clear transparency of the laminated packaging film even in the presence of humid air tending to condense moisture on the surface of the packaged product.

The present invention is an improvement upon my prior co-pending application Serial No. 698,400, filed November 25, 1957, of which the present application is a continuation-in-part, and which parent application in turn is an improvement upon and a continuation-in-part of application Serial No. 597,353, filed July 12, 1956, co-pending therewith and now abandoned.

A primary object of the present invention is in the application of an improved transparent organic film comprising a laminate, as above stated, the inner transparent organic plastic film contiguous to the meat surface comprising a water insoluble film, preferably ethyl cellulose applied by dipping in a hot melt ethyl cellulose composition, outstanding because it is well plasticized to maintain its flexibility in the frozen condition. That water insoluble coating, as known in the art, is necessary to retain the moisture in the meat and prevent drying out over an extended storage period. That ethyl cellulose film coating, however, is extremely slippery due in some part to its film plasticizer, but also possibly due to the tendency of moisture to condense and deposit as a cloud and frost thereon in an exposed sales counter, if the meat is left out of frozen storage or during defrosting periods or even in short exposure to moist air, obscuring the content and desirable appearance of the packaged meat, and which becomes very slippery and very difficult to handle. A readily compatible water soluble film is superimposed upon that water insoluble packaging film as a laminate, preferably as a hot melt dip, which can be applied immediately following application of water insoluble ethyl cellulose coating, that water soluble film containing a humectant. That water soluble film is preferably gelatin and the humectant preferably used herein is glycerine or other polyhydric aliphatic alcohol. It is found that the glycerine not only readily plasticizes the gelatin coating but forms a continuous transparent film upon the lower hot melt applied ethylcellulose coating as to give continuous transparency without clouding, entrapment of air bubbles, blushing, or other discoloration. Thus the laminate is so surprisingly compatible as to give the appearance of a single integral film. More important, however, is the surprising result that the coated meat having the outer coating of humectant containing water soluble film is readily handleable, that is, it is not slippery and it does not form a frost or cloud upon the coated product. The coated meat retains its transparency even when removed from the refrigerated storage or sales counter or during the defrosting cycle of the showcase.

The coating method of the present invention is in further contrast to prior coating methods of the art which apply a coating directly to a food product, such as meat, in that the coating according to the present method is applied to a meat product which has at least its outer surface pores sealed by freezing whereby the coating does not tend to penetrate beneath the frozen meat surface. As mentioned in my parent applications, the meat can be completely frozen throughout the body, but for rapid packaging, including rapid freezing, the conventional blast freezing, is preferred, i.e. freezing by blowing air cooled to a temperature well below freezing upon the meat which cools the meat and ultimately freezes it quite rapidly whereby the packaging procedure is rapid. The advantage of that freezing method is not only very rapid freezing, but by the maintenance of a large temperature differential between the cooling medium and the meat product to be frozen, the process operates to freeze the meat from the outside inward. For purposes of coating, according to this invention, only the surface of the meat needs to be frozen, thus sealing the surface pores before coating so that the preferably molten liquid coating composition will not penetrate into the meat, and the sometimes extensive period of time needed for thorough freezing of large meat sections, need not be expended. Thus, the meat may have only its outer surfaces blast frozen, it may be then coated according to the present procedure, and the coated partially frozen meat finally placed in a storage chamber at sub-freezing temperature for indefinitely long storage periods, whereby the entire meat body freezes through to the center. Thus, the partial freezing has the advantage of rapid processing of the meat to include packaging according to the present method. Another advantage is that the several processing steps including coating and the very long step of freezing are made more evenly timed by reducing freezing time intermediate other process steps. Further advantages of this will be apparent from the further processing description.

Even where the meat has carefully been only surface frozen or frozen even more deeply but rapidly, and particularly when frozen by the preferred blast freezing method, fine ice crystals formed in and on the surface of the meat give the surface of the fresh frozen meat a frosted opaque or sugary appearance, so that immediate coating of that kind of meat, even with a desirable transparent film coating of any character, preserves in the meat not the desired fresh red color but only the frosted opaque appearance imparted by the quick freezing of the surface. Moreover, in the conventional frezing of meat, the meat surfaces often become discolored, and over long storage periods of contact with cold refrigerator surfaces, the meat surface even becomes blackened or "burned." Such meat has very greatly reduced sales appeal. It is known to treat fresh meats with an anti-oxidant for purposes of maintaining the normal fresh red appearance of fresh cut meat. A typical such anti-oxidant composition comprises ascorbic acid, niacin and dextrose used for this purpose as an aqueous solution in which the meat is dipped for preserving its red color as taught in U.S. Patent 2,491,646.

In a further aspect of this invention, I have found that if the meat having at least its surface frozen, is dipped in a dilute brine solution, for instance, 5 to 15% brine, preferably about 10%, the ice crystals in the surface of the meat are liquefied or washed off in the brine solution. In any case, a small amount of the brine tends to melt the ice and wet the surface of the frozen meat sufficient to remove the opacifying frost and the outermost ice crystals from the surface of the meat, which resets or is refrozen to a transparent glaze whereby the desired real rer meat appearance of the natural fresh cut meat is restored in that brine dip. That red meat appearance remains on the dipped frozen meat notwithstanding the liquid brine coating subsequently refreezes by heat transfer from the cold meat body which by the momentary brine dip has not been substantially warmed throughout its body. The brine inherently has a preservative effect upon the meat, as is known, and that brine solution containing only common salt may be used on the meat alone; or desirably that solution may be fortified with antioxidants such as the ascorbic acid composition shown in U.S. Patent 2,491,646, or even other anti-oxidants may be substituted. The advantages, therefore, of that brine dip is several fold, and include liquefaction, washing off, or merely conversion of the opaque ice crystals to a clear transparent ice film upon the meat which enhances the natural red color of the meat, preserves that natural red coloring and forms a transparent ice or uncoated red meat surface base upon which transparent organic wrapping films are readily applied. That preliminary partial or complete freezing followed by a brine dip usually but not essentially containing other preservative I call "transparency conditioning."

It is accordingly the object of this invention to incorporate the several improvements mentioned but other objects will be inherent in the preferred practice of this invention which I now describe.

According to the preferred procedure, the meat is first blast frozen by suspending the same in a blast of air cooled to temperature range at least below —10° F. and preferably below —20° F., most usually in the range of about —20 to —25° F. until at least the outer surface of the meat is sealed by being hard frozen. It will be understood, as noted above, that whether the entire body of the meat or only the outer surface is frozen will be governed by the economics of continuous handling of the type of meat cut, particularly considering the size of the meat cut and the time needed to penetrate the body of the meat for complete freezing, and whether the process is to be practiced in a continuous packaging, that is, moving of the meat on conveyors from one stage to the next and the timing required for each stage to determine the amount of time available for complete or only partial freezing. In a continuous system, to which the present method is well adapted, the meat moving continuously is moved generally on a conveyor to treating stations, automatically, but manually, weighed and simultaneously priced for retail sale whereby the weight and price may be immediately printed by an automatic weigher-pricer machine, as is commercially available. The frozen meat after weighing and pricing is labeled with a water wet label which instantly adheres to the meat without further adhesive. Then the labeled meat is given a quick dip in brine. As described above, the brine solution comprises approximately 10% sodium chloride in water which further contains about .5% ascorbic acid, about 0.2% of niacin and 1% dextrose. If the meat has been hard frozen it may be immediately further treated in a hot melt packaging coating, but it is preferred to convey the meat through refrigerated chambers, which may be merely static refrigeration or further treated in a blast freeze as may be convenient, to again refrigerate the meat to restore its initial cold temeprature. Thereafter the meat is ready for packaging by multiple dipping in organic film forming solutions.

That first organic coating film may be of several types and applied by various methods, but I have successfully used a molten liquid comprising 19 to 70% ethyl cellulose having an ethoxyl content of about 42 to 50%, preferably 47 to 50%, the balance being mineral oil and/or other plasticizer oils as described in U.S. Patents 2,840,474, 2,840,476, 2,804,400, 2,804,399, 2,394,101, British Patent 734,968, Canadian Patent 525,610, and I prefer the composition sold as Ethocel for this purpose and which is defined in Dow Bulletin #4 of 1957 and in U.S. Patent 2,840,476. That hot melt has the following general composition: 20 to 35% ethyl cellulose (preferably 30 cps. or less), 50 to 65% refined mineral oil and 5 to 20% of non-toxic plasticizer, all percents being by weight. The hot melt composition may further and optionally contain up to 10% of epoxidized natural glyceride of unsaturated fatty acids, up to 2% antioxidant and up to 0.5% of color stabilizer. I prefer such ethyl cellulose solutions because they are plasticized adequate for melting at useful coating temperatures in a wide range of 150 to 350° F. and to impart the desired flexibility to the water insoluble film forming composition without penetration through the ice film into the meat to impart any oily taste factor. Moreover, that film forming composition has optimum compatability with the water soluble film next to be applied.

Accordingly, following my preferred procedure the brine dipped transparency conditioned frozen meat is dipped in a hot melt of ethyl cellulose as above described, removed from that hot melt kettle after a quick dip, preferably not exceeding 20 seconds and usually not more than 5 to 10 seconds and then removed from the kettle. The hot melt composition freezes quickly into a continuous transparent film upon the meat. The meat is then dipped in a hot melt water soluble film forming composition containing a humectant. For this purpose I have found gelatin, and as a humectant and for its anti-freeze properties, I prefer glycerine, contained therein in quantity not only sufficient to plasticize and render that gelatin film compatible with the water insoluble Ethocel film, but further to impart the desired humectant and anti-freeze properties thereby to maintain the transparency and non-clouding character of the combined films. For this purpose I have used as water soluble hot melt film forming composition a solution of 15 to 65% gelatin and 20 to 60% polyhydric alcohol, preferably glycerine, the balance being water. As thus coated the meat retains its natural appearance of being fresh cut meat, it can be picked up and handled, and the weight-price data is clearly observable.

For further understanding of the invention, reference may be made to the attached drawing wherein Fig. 1 shows a coated frozen steak;

Fig. 2 illustrates cutting with a knife to sever the coating into strips for removal;

Fig. 3 illustrates the manner of peeling cut strips from the steak;

Fig. 4 shows the steak with the two layers of laminated coating.

As shown in Fig. 1, illustrating a wrapped section of this invention, a meat cut has an almost invisible laminated film 10 so closely adherent thereto that the meat does not even appear to be wrapped. That adherent film laminate 10, however, is peelable as shown at 12 (Fig. 3) wherein a cut portion extends outward from the packaged meat. It can be peeled in that manner by merely cutting the coating with a knife 13 as shown in Fig. 2 and peeling back in sections as shown in Fig. 3.

As shown in Fig. 4, the meat cut coating has the inner layer portion of the laminate 20 formed of water insoluble film forming substance which is coated directly adjacent to the frozen surface of the meat and, superimposed thereon, is the water soluble film forming substance 22.

While these fingers are intended merely to be illustrative, it will be understood that any number of intermediate plies of water insoluble film may be used in a coating of this type and the outermost ply should be water soluble.

I have described my invention in its preferred practice using ethyl cellulose as the preferred water insoluble coating and gelatin containing glycerine as the humectant as the preferred water soluble coating. However, it is believed that this invention may find more generic application in the film forming compositions that may be used as well as in their manner of application and the ensuing description includes the more generic aspects as well as examples of their use.

FILM FORMING COATING COMPOSITIONS

A. Water soluble

As described above and in my parent application Serial No. 597,353 the water soluble film forming composition comprising the outer coating which may comprise gelatin and solvent adjusted in concentration from about 15 to 65% solution, preferably 20 to 50%, by weight of gelatin in the solution. The solvent is an aqueous solution containing 20 to 60% of humectant, such as glycerin or other polyhydric aliphatic alcohol dissolved in water. The humectant may be present in quantity ranging from about 20 to 50%. The humectant imparts desirable antifreeze properties to the solution so that a most desirable formulation is to add sufficient glycerine to water to lower its freezing point down to a desired freeze resistant temperature such as between 0° F. and —25° F., and then use that solution as a solvent for the gelatin. The solution may optionally further contain up to about 10% of fat or oil and up to about 10%, preferably 2 to 8%, of a humectant, usually comprising a polyhydric alcohol.

That water soluble film forming gelatin coating as described in my parent application, is a preferred coating, but other water soluble film forming substances which are gelatinous in nature may also be used, but less advantageously, as a water soluble coating. For example, a gelatinous solution in water of such gelating agents such as pectin, algin, methyl cellulose, water soluble (less than about 30% ethoxyl content) ethyl cellulose, and the like, may be substituted for the gelatin. In each case sufficient such gelating agent is used to ultimately form a continuous water soluble transparent gelatinous film, usually in the range 15 to 65% gelating agent, a solution in water of up to 60%, preferably 20 to 50% by weight of a polyhydroxy aliphatic alcohol which, as noted, acts both as antifreeze and humectant.

The humectant is a readily water soluble component which preferably has hygroscopic properties tending to absorb small quantities of moisture and to dissolve the moisture therein. For this purpose, any of the polyhydric alcohol compounds, preferably edible, are useful. Such substances as glycerine, ethylene glycol, propylene glycol, mannitol, sorbitol, molasses and various natural sugars and the like, are preferred humectants. The composition, when applied as an inner coating upon the meat, does not need a humectant, but such may be present. However, the humectant present in the water soluble outer coating of the laminate thus absorbs any moisture condensed on the outer coating preventing frosting, and quite rapidly so that the combined laminate film coating has the appearance of being clear and brightly visible under continuous cold storage and display conditions of the frozen meat.

The outer coating formed as above described also functions to absorb any plasticizing oil used in the inner coating and remaining on the surface of the inner coating. If the oil were unabsorbed the double coated product would be dull in appearance. Such dullness is eliminated by this functioning of the outer coating.

B. Water insoluble

As described in my parent application Ser. No. 698,400, the water insoluble film forming coating may comprise substances generally typical of commercial wrapping films applied, however, from liquid film forming state. Thus, liquid film forming compositions comprising such commercial products as Saran, Ethocel, Saran F–20, Pliofilm, cellulose acetate or the like, may be used. Such compositions preferably comprise ethyl cellulose as above described. All of these film forming plastics are water insoluble and soluble in common oxygenated solvents like lower alkanols, aliphatic esters, ketones and the like. Other useful polymers are polyvinylidene chloride, polyvinyl chloride, polyvinyl acetate, polyvinyl acetal, polymers of lower alkyl esters of acrylic acids, mixtures thereof, copolymers of their monomers and the like. The film forming composition may further comprise or include polystyrene, rubber hydrochloride, polyethylene, polyepoxy resins, halogenated polyolefines such as chlorinated rubber and other typical food film wrapper type film forming compositions well known in the art.

Any of such water insoluble film forming compositions may comprise the polymer suitably plasticized and preferably conditioned to melt with heat at such temperatures as stated, whereby the product may be applied to the meat as a hot dip without using volatile solvents. They may be applied with less advantage than the described hot dip by other methods such as by spraying, brushing, and often may be applied in a solvent which is evaporated or suspended as a latex in water.

THE COATING PROCESS

The meat is first frozen sufficient to harden and freeze-seal the pores of the surface. Thus, the meat may first be solid blast frozen, as in conventional freeze methods, and thereafter coated before any substantial drying and/or discoloration is imparted in the frozen storage. To shorten the freeze time, the blast freeze exposure may be applied to merely partially freeze, sufficient to harden and thereby seal the pores of the surface to provide a continuous non-adsorptive support of the meat surface for the coating, and after coating, to complete the freezing in storage.

The coating may be applied to the meat as a liquid by any of the commonly known coating methods, such as spraying, brushing or dipping, as preferred in a hot melt liquid. The fact that the meat is prefrozen lends itself to such variety of coating procedures which would not otherwise be practically applicable to the coating of any unfrozen food product, and even affords substantial variation in the physical character of the coating composition. For example, brushing or spraying, or the surface being frozen, it is even practicable to apply thereto a coating composition comprising a latex suspension comprising plasticized particles of the water insoluble film forming substance suspended in water.

However, because the meat is frozen, it is best coated with a film forming substance which is in molten form and which sets rapidly by cooling in contact with the frozen meat surface whereby the meat is coated by dipping in a molten film forming composition from which the film will form by freezing in momentary contact with the frozen meat surface to a solid film, thus rapidly forming a set and continuous film coating upon the meat in such frozen contact.

That water insoluble film composition, as stated, instead of the preferred ethyl cellulose, may be any of the other water insoluble film forming substances, such as listed above. Preferably as another choice it will be a vinyl type of coating such as a Saran wrap, comprising one of the vinyls, preferably about 85% polyvinylidene chloride copolymerized with another vinyl monomer such as vinyl acetate or vinyl chloride, sometimes containing modifying resin components, polymers or monomers, such as styrene, epoxy phenols, rubber hydrochloride, and the like.

The water insoluble film forming composition, such as a polyvinyl compound, when used in the form of a latex, in the manner known in the art, usually contains from 30 to 70% solids, typically about 35 to 55% solids in water. It may comprise a film forming solution in an organic solvent, preferably one which is readily volatile, for instance, a lower ketone, such as acetone or methyl ethyl ketone, a lower ester, such as ethyl acetate, butyl acetate or the like; or a lower alcohol, such as ethanol; or mixtures of solvents of this character in which the film forming substance is soluble, and the solution dispersed in water as a latex; or the solution applied to the meat as a spray or dip.

Preferably, by plasticizing these water insoluble film forming substances with typical plasticizers, for example, dibasic aromatic, such as phthalic acid esters or aliphatic acid esters, such as citric or tartaric acid (fruit acid) esters of a 1–8 carbon atom, lower alkanol. That plasticization may, as a plastisol, be sufficient to render the resin film forming composition substantially liquid and molten when heated to moderate fusing temperatures usually in the range of about 150 to 350° F.

Thus, the water insoluble coating composition first applied to the frozen meat surface may be, as pointed out, either a latex, a solvent solution or plasticized molten composition in which the preferably brine dipped frozen meat is dipped so momentarily that even at the raised temperatures of the coating compositions, the frozen character of the meat is not appreciably disturbed. After coating of the meat with the water insoluble film the meat may be again cooled, if desired or needed, but usually such further cooling is not necessary. Where the coating composition has a solvent, it may be exposed to a cold air stream for evaporating the solvent.

The set water insoluble film coated meat is then given an outer coating of a water soluble film containing a humectant, preferably a polyhydroxy alcohol as listed above. The meat then is stored in the freezer or sales display case at the usual temperature to complete the freezing if it was only partially frozen or to maintain the meat frozen.

The preferred steps of this process, in detail, consist of first freezing the fresh meat to a temperature in the range of around 0 to —20° F., the lower temperature of which is the approximate limit of the conventional temperature of frozen meat. This temperature is not critical in this process, it being desired only that the meat be either at least surface frozen or completely frozen in the normal manner. Immediately thereafter, the frozen meat is dipped into brine for a period of around 10 or so seconds, or sufficiently long to form a preservative coating. The content of salt in the brine usually 5 to 15% is not critical, and the length of time for the forming of the coating is not critical either. The object here is simply to form a quick brine protective coating on the meat. Then, the prime water insoluble film plastic coating of "Saran" or "Ethocel" is applied in any suitable manner, for example, as described in the Bulletin #4 of 1957, or one of the patents listed above.

When gelatin comprises the outer coating, it is normally maintained hot and molten but the dip of the meat into the gelatin is sufficiently fast that the meat is not defrosted nor otherwise affected by the coating. The gelatin coat is almost immediately solidified and, in a few seconds, completely solidified into a continuous thin, transparent flexible laminated and non-frosting coating. The thickness of the coatings is not critical. However, the coating should be completely continuous with no breaks to preserve sealing.

The following examples illustrate typical film forming compositions in which the frozen meat product is dipped or sometimes sprayed.

*Example I*
BRINE DIP

| | Percent by weight |
|---|---|
| NaCl | 10 |
| Niacin | 0.2 |
| Ascorbic acid | 0.5 |
| Dextrose | 1.0 |
| Water | 88.3 |

*Example II*
WATER SOLUBLE FILM FORMING COMPOSITIONS

| | |
|---|---|
| Gelatin | 45 |
| Glycerin | 30 |
| Water | 25 |

*Example III*

| | |
|---|---|
| Pectin | 25 |
| Olein (fats) | 6 |
| Glycerin (humectant) | 30 |
| Water | 39 |

*Example IV*

| | |
|---|---|
| Gelatin | 35 |
| Molasses | 25 |
| Water | 40 |

*Example V*

| | |
|---|---|
| Algin | 40 |
| Sorbitol | 35 |
| Water | 25 |

*Example VI*
WATER INSOLUBLE FILM FORMING COMPOSITIONS

| | |
|---|---|
| Vinylidene chloride | 850 |
| Vinylchloride | 150 |
| Dihexyl sodium sulfosuccinate | 60 |
| Hydrogen peroxide 30 vol. (polymerization catalyst) | 35 |
| Water | 2500 |

The mixture is agitated at 36° C. for nine hours to form a copolymer latex and is then used as a dipping solution.

*Example VII*
SOLVENT SOLUTION

Saran resin formed as a co-polymer of 85% of vinylidene chloride and 15% of ethyl acrylate is plasticized by 5% of di 2-ethylhexyl phthalate and dissolved as a 15% solution in acetone, all percentages by volume.

*Example VIII*

Rubber hydrochloride is dissolved as a 10% solution in ethyl acetate.

*Example IX*

Cellulose acetate is dissolved as a 15% solution in a mixture of ethyl alcohol and acetone 50–50.

*Example X*
ETHYL CELLULOSE HOT MELT COMPOSITION

| | Percent by weight |
|---|---|
| Ethyl cellulose (46.8 to 48.5 ethoxyl, 22 centipoises viscosity) | 30 |
| Low molecular weight polymer of a mixture of styrene and styrene homologue | 20 |
| Glycerol ester of hydrogenated rosin | 23 |
| L–1 white oil (mineral oil) | 23 |
| Paraffin wax | 3 |
| Methylphenol | 1 |

*Example XI*

| | |
|---|---|
| Ethyl cellulose, 10 cps. | 22.9 |
| Refined mineral oil, Saybolt viscosity at 100° F., 95/105 units | 62 |
| Acetyl tributyl citrate ("Citroflex A–4") | 7 |
| Castor oil ("Crystal-O") | 6 |
| "Paraplex G–62" | 2 |
| Citric acid | 0.1 |

The ethyl cellulose composition of which both Examples X and XI are typical hot-melt compositions of the present invention will have an ethoxyl content from about 42% to about 50% and preferably from about 46.8% to about 50%. Viscosity types ranging from about 14 centipoises to about 50 centipoises are preferred, although lower and higher viscosity types of from about 7 centipoises to about 200 centipoises may be used. The viscosities indicated are those of a 5% by weight solution of ethyl cellulose in a solvent mixture consisting of 80% toluene and 20% ethyl alcohol by weight at 25° C.

The various plasticizers and other resins are warmed to a temperature of about 200° C. with stirring and the ethyl cellulose added last, continuing the stirring until a homogeneous hot-melt composition is formed. Thereafter, the composition is cooled to a temperature between about 160 and 180° C. and used as a hot-melt dip composition in which the frozen meat is given a quick dip as a first coating. Thereafter it will be coated with one of the water soluble film compositions, such as set forth in Examples II to V. It is clear that while the coatings have been described as formed by dipping, other methods, such as spraying, flowing on or pouring, etc. may also be used as desired.

*Example XII*

Meat is first frozen, dipped in the brine solution of Example I, refrozen, dipped in the solution of Example VI and then dipped in a gelatin solution of Example II. The meat product was transparently visible through the coating and was readily handleable and sold. The film coating was not brittle and was readily useable by peeling the coating from the meat. Similarly useful laminate products were produced according to this example by substituting for the water insoluble film coating of Example VI, the coating composition of Examples VII, VIII and IX and in each case, evaporating the solvent in a current of warm air.

The applying of the gelatin coating after the plastic coat has proven superior. For example, the thus coated frozen meats are non-skid, and stack well in a display case. The packages did not cloud on removal from a freezer. The gelatin coating gives a gloss to the package, prevents abrasion of the plastic coat, prevents condensation on it, prevents air bubble blisters from forming under the plastic coat, prevents separation between meat and plastic film, and seems to absorb oil found in such film.

With the coating as described above, the frozen meat maintains its normal condition of appearance and at the same time there is no loss of moisture, juices, etc., all of which detract from the nourishment and appearance of the meat. Likewise, no additional packaging or wrapping is required since the meat coated as above, may be handled and inspected by the consumer and will maintain its fresh looking appearance. Once the consumer chooses a package of meat, all she has to do is peel the coating off and cook the meat in the usual way.

*Example XIII*

In a test experiment to illustrate the value of multiple coating, as contrasted with single coating, a single coating employed, using as the coating the water insoluble film, "Ethocel" according to Example XI. A double coating was comparatively employed in which a first coating is the same single coating having superimposed thereon a second coating according to Example II, the gelatin coating. A frozen steak was thus coated with Dow "Ethocel" and dried; and then the left half only of that steak was dip coated in the melted gelatin coating hereof and dried. The comparative results were as follows:

(1) The double coated left half remained non-cloudy despite being left in a freezer showcase for several hours, but the single coated right half clouded and formed on itself a white opaque "frost."

(2) The meat showing through the left half coating was considerably brighter red than the meat showing through the right half coating; the right half coating was considerably duller than the left hand coating and also had the effect of dulling the color of the meat showing through.

(3) The surface feel of the left half was considerably more dry and pleasing than that of the right half, the latter having a somewhat oily and wet feel.

(4) The left half double coating provided sufficient friction so that the meat could be held with a finger grip whereas with the right half coating alone, the meat would tend to slide out of the fingers when the steak was held with a finger grip.

(5) The left half coating provided sufficient friction to enable me to conclude that double coated meat products could be stacked for display without sliding around, but the right half coating was considerably more slippery and supported experiments on other pieces of frozen meat that the right half single coating would not be satisfactory for stacking of meat slices for display purposes.

*Example XIV*

In another illustration, a leg of lamb was coated with "Ethocel" according to Example XI. The shape of this meat product and the nature of the surface so formed were such that it was difficult to hold the product in one hand because it tended to slide out of the fingers. When the same piece of meat was thereafter coated with the gelatin coating described in Example II, the slipperiness of the product was considerably reduced and in fact practically completely eliminated, thus making handling of it much easier.

One of the important properties of the gelatin coating as I have used it is that it forms a coating on the meat product which will not scuff and scratch and abrade. Hence, the product may be stored and shipped and subjected to the usual hazards in merchandizing such products and the gelatin coated product retains its original appearance and does not show signs of wear which result in lessening the appeal of the product to the purchaser.

This invention may be further developed within the scope of the following attached claims and accordingly, it is desired that the foregoing description be read as being merely illustrative of an operative embodiment of this invention.

I claim:

1. The method of packaging frozen food, comprising enclosing the frozen food product in a continuous solid transparent film laminate, said laminate comprising an inner ply of a solid transparent water insoluble vapor barrier plastic film and an outer ply of a solid transparent water soluble plastic film containing a humectant.

2. The method as defined in claim 1 wherein the water insoluble inner ply plastic film substance is a member of the group consisting of polyvinylidene chloride, polyvinyl chloride, polyvinyl acetate, polyvinyl acetal, polysytrene, poly lower alkyl esters of acrylic acid, rubber hydrochloride, polyethylene, polyepoxy resins, halogenated polyolefines, cellulose acetate, water insoluble ethyl cellulose and mixtures and co-polymers of said film forming substances.

3. The method as defined in claim 1 wherein the water insoluble film forming composition is a hot-melt composition.

4. The method as defined in claim 1 wherein the water insoluble vapor barrier film forming substance comprises water insoluble ethyl cellulose.

5. The method as defined in claim 1 wherein the water soluble film forming substance is a member of the group consisting of gelatin, algin, pectin and a water soluble lower alkyl ether of cellulose, said water soluble film forming composition further containing a humectant.

6. The method of packaging frozen food, comprising dipping the frozen food product in a hot liquid melt of a water insoluble plastic composition, thereby forming in contact with the cold meat surface a continuous transparent water insoluble solid plastic vapor barrier film thereon, then dipping the coated product in a second hot liquid melt of a water soluble plastic humectant containing composition thereby forming a continuous transparent water soluble solid film containing a humectant on the outer surface of the frozen product.

7. The method of packaging meat having at least its surface pores sealed by freezing, comprising first transparent conditioning the frosted frozen meat surface by wetting with a dilute brine solution and then enclosing the frozen product in a continuous solid transparent film laminate, said laminate comprising an inner ply of a solid transparent water insoluble vapor barrier plastic film and an outer ply of a solid transparent water soluble plastic film containing a humectant.

8. The method of packaging frozen meat comprising dipping the frozen meat in a dilute brine solution containing an anti-oxidant comprising ascorbic acid, then dipping the heat in a liquid hot melt coating composition comprising ethyl cellulose and plasticizers therefor, said liquid hot melt composition being adapted to set to a continuous solid transparent film in contact with the cold surface of the meat, and then dipping the meat in a second liquid hot melt composition comprising gelatin containing glycerin as a humectant.

9. A packaged frozen food product having its content clearly visible from all surfaces comprising a frozen solid food having a continuous transparent water insoluble vapor barrier solid plastic film upon all of its exposed surfaces and, as a laminate thereon, an outer continuous transparent water soluble solid plastic film containing a humectant, said product being packaged by the method of claim 2.

10. A packaged frozen food product as defined in claim 9 wherein the frozen food product is frozen meat which has been first dipped in dilute brine containing an anti-oxidant whereby the frozen meat has a continuously preserved red meat color and the frozen ice in the surface is a transparent glaze, the inner vapor barrier film is plasticized water insoluble ethyl cellulose and the outer water soluble film is gelatin containing glycerin as a humectant.

References Cited in the file of this patent

UNITED STATES PATENTS

| | | |
|---|---|---|
| 2,337,645 | Cadwell | Dec. 28, 1943 |
| 2,462,760 | Mitchell et al. | Feb. 22, 1949 |
| 2,811,453 | Childs | Oct. 29, 1957 |
| 2,840,474 | Wirt et al. | June 24, 1958 |
| 2,864,708 | Tebbens | Dec. 16, 1958 |